(12) United States Patent
Nishimura

(10) Patent No.: US 6,547,425 B2
(45) Date of Patent: Apr. 15, 2003

(54) AUTOMATIC HEADLIGHT AIMING DEVICE FOR VEHICLES

(75) Inventor: Kenichi Nishimura, Gifu (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/824,586

(22) Filed: Apr. 3, 2001

(65) Prior Publication Data

US 2001/0039469 A1 Nov. 8, 2001

(30) Foreign Application Priority Data

Apr. 3, 2000 (JP) .......................... 2000-100561
Mar. 14, 2001 (JP) .......................... 2001-071408

(51) Int. Cl.[7] .................. B60Q 1/06; B60Q 1/08; B60Q 1/10; F21V 1/00
(52) U.S. Cl. ................. 362/466; 362/467; 362/37; 362/276
(58) Field of Search ................ 362/464, 465, 362/466, 467, 37, 459, 276, 802; 340/465, 466, 467; 315/76, 77, 78, 79, 80, 81, 82, 83, 84

(56) References Cited

U.S. PATENT DOCUMENTS

| 6,130,506 A | * | 10/2000 | Lopez et al. ............. 315/82 |
| 6,176,590 B1 | * | 1/2001 | Prevost et al. ........... 362/37 |
| 6,343,869 B1 | * | 2/2002 | Kobayashi ............... 362/37 |

FOREIGN PATENT DOCUMENTS

| DE | 19860676 | 7/2000 |
| EP | 0847895 A2 | 6/1998 |
| JP | 07047878 | 2/1995 |
| JP | A-7-32936 | 8/1995 |
| JP | 07246873 | 9/1995 |

* cited by examiner

Primary Examiner—Sandra O'Shea
Assistant Examiner—Sharon Payne
(74) Attorney, Agent, or Firm—Nixon & Vanderhye P.C.

(57) ABSTRACT

The present invention changes the headlight optical axis of a vehicle in relation to an inclination angle during normal control and to properly adjust the optical axis according to information including front information about a car ahead. The headlight optical axis is adjusted based on the inclination angle of a vehicle, road information in the direction of travel, presence of a car ahead, a distance between vehicles, and the center optical axis angle corrected according to changes in horizontal and vertical behavior of the car ahead.

13 Claims, 5 Drawing Sheets

AUTOMATIC HEADLIGHT AIMING DEVICE FOR VEHICLES

CROSS-REFERENCE TO RELATED APPLICATION

The present invention is related to Japanese patent application No. 2001-71408, filed Mar. 14, 2001, the contents of which are incorporated herein by reference.

FIELD OF THE INVENTION

The present invention relates to an automatic headlight aiming device, and more particularly to an automatic headlight aiming device that automatically adjusts the direction of the vehicle headlights optical axis.

BACKGROUND OF THE INVENTION

In conventional vehicle headlights, oncoming vehicle drivers are blinded if the direction of the headlight optical axis is directed upward by the vehicle body inclination. Alternatively, if directed downward, the driver's distance visibility is reduced. Therefore, there is a demand for keeping the headlight optical axis fixed.

There is also conventional headlight adjusting device capable of controlling the range of light projection of the headlights according to information from a car navigation system mounted in the vehicle. This type of control device controls the headlight optical axis direction according to map information given by the car navigation system. However, it is difficult to control the headlight optical axis direction corresponding to actual road conditions because of various errors.

There is also a conventional system which recognizes a reference point on the car ahead after image processing by a CCD camera estimates conditions of the car ahead. Such a system is disclosed in JP-A-7-32936. It then controls a headlight optical axis based on the detected road conditions.

However, this system uses the largest point of illumination on the car ahead to decide the reference point. As such, sometimes this camera catches a bright street light or other illuminated object instead of the vehicle. Moreover, this system is only useful at night.

SUMMARY OF THE INVENTION

The present invention provides an automatic headlight aiming device that adjusts the vehicle's driving environment according to information including cars ahead, while allowing deviation from a control angle in ordinary control for holding the optical axis of the headlights in a fixed direction.

In one aspect of the invention, the inclination angle of the headlight optical axis from the road surface is computed by the inclination angle computing means by referencing the vehicle information detecting means which detects the inclination information of a vehicle, movement information, and acceleration information. Then, the headlight optical axis is adjusted by the optical axis adjusting means, with reference to the optical axis center angle determined by correcting and computing the inclination angle by the optical axis center angle computing means according to the front information fed from the front information detecting means. That is, road information in the direction of vehicle travel is detected by the vehicle information detecting means. The presence or absence of a car ahead, distance between vehicles, and upward and downward behavior variations are detected by the front information detecting means. Therefore, beside a normal control by the inclination angle obtained from the vehicle information, the adjustment of the optical axis is performed, when needed, by referring to road information and the optical axis center angle after correction by a behavior change of a car ahead. It is therefore possible to improve the driver's visibility of a forward road condition and a car ahead when changing to correct the normal control of the headlight optical axis direction without blinding the driver in the car ahead.

In another aspect, the center angle of the optical axis is computed by the optical axis center angle computing means after correction by using the horizontal and vertical displacement of the car ahead. When a specific threshold value is exceeded, the inclination angle is corrected to compute the center optical axis angle. Thus, the headlight optical axis direction is properly corrected without causing the driver to feel uncomfortable.

In another aspect, when the horizontal displacement of the car ahead exceeds a predetermined value, the range of light projection is changed according to the vehicle's turning direction by the horizontal adjusting means. The horizontal adjusting means adjusts the headlight optical axis in the horizontal direction.

In another aspect, when the displacement exceeding the predetermined value is detected by a horizontal change of the car ahead, the right front or left front supplementary lamp of the vehicle is lit to widen the range of light projection.

Further areas of applicability of the present invention will become apparent from the detailed description provided hereinafter. It should be understood that the detailed description and specific examples, while indicating preferred embodiments of the invention, are intended for purposes of illustration only, since various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings, wherein.

DETAILED DESCRIPTION OF THE INVENTION

Figure 1:
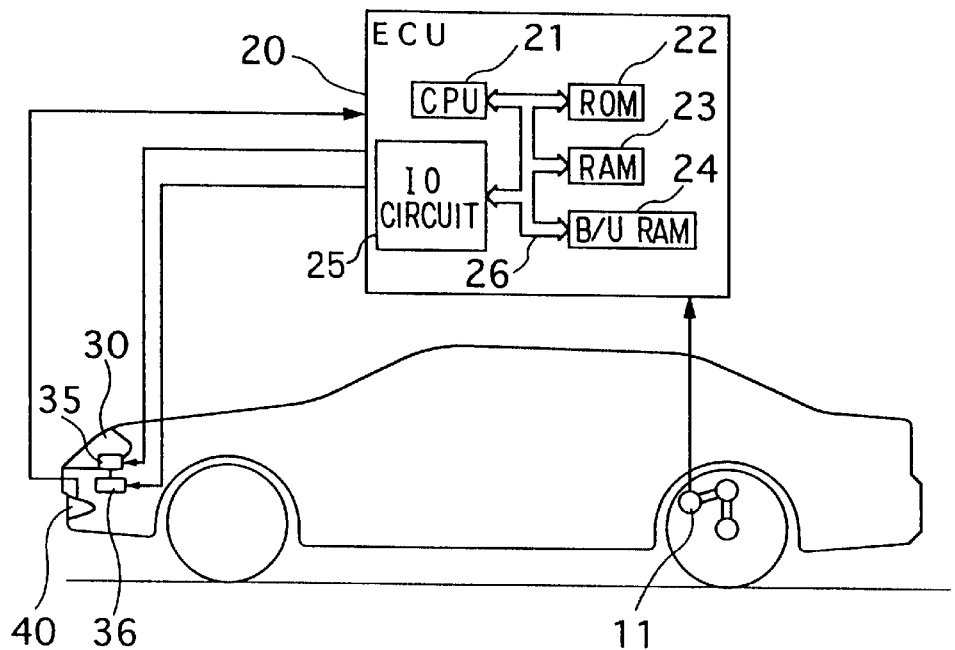
FIG. 1 is a schematic view of an automatic headlight adjusting device according to the invention.

In FIG. 1, a height sensor 11 is mounted on the rear wheel axle, either on the driver's or passenger's seat side of the vehicle. From the height sensor 11, the relative displacement between the rear wheel axle and the vehicle body, that is, the rear vehicle height (the displacement of the vehicle height on the rear wheel side), and signals from other sensors such as a vehicle speed sensor (not shown) and a G sensor (not shown) are input to an ECU (electronic control unit) 20 mounted on the vehicle.

The ECU 20 is a logical operation circuit comprising a CPU 21, a ROM 22 storing a control program, a RAM 23 storing various kinds of data, a B/U (backup) RAM 24, an I/O (input/output) circuit 25, and a bus line 26 for connecting these parts. An output signal from the ECU 20 is input to actuators 35 and 36 located on the headlight 30 side, thereby adjusting the headlight optical axis direction 30.

The vehicle is provided with a known laser radar mechanism 40, for instance in the front bumper section, for detecting information in front of the vehicle. This information, such as a distance from and a change in behavior in the car ahead, thus detected by the laser radar mechanism 40 are input into the ECU 20 as described later. This information is used to adjust the direction of headlight optical axis 30. Also mounted on the vehicle is a known car navigation system (not shown) for detecting road information. It is understood that an image information processing system using an EHF radar mechanism and a CCD camera may be similarly mounted in place of the laser radar mechanism 40 for detecting the information in front of a vehicle.

Figure 2:
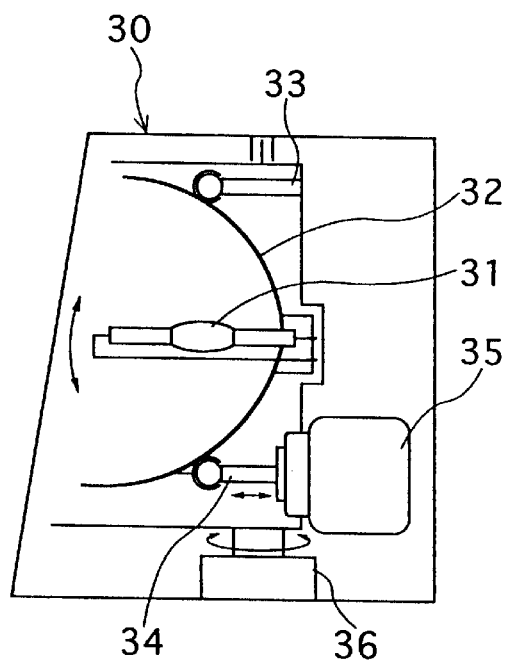
FIG. 2 is a cross-sectional view of a headlight according to the invention.

In FIG. 2, the headlight 30 is comprised chiefly of a lamp 31, a reflector 32 securing the lamp 31, a support section 33 which supports the reflector 32 and swings in the direction of the arrows, another movable part 34 which supports reflector 32, the actuator 35 such as a step motor for driving the movable part 34 back and forth in the directions of the arrows, and an actuator 36 including a step motor for driving an integrated assembly of these components rotationally for horizontal adjustment as indicated by the arrow. The initial setting of the headlight 30 optical axis is performed based on that only the driver is in the vehicle.

Figure 3:
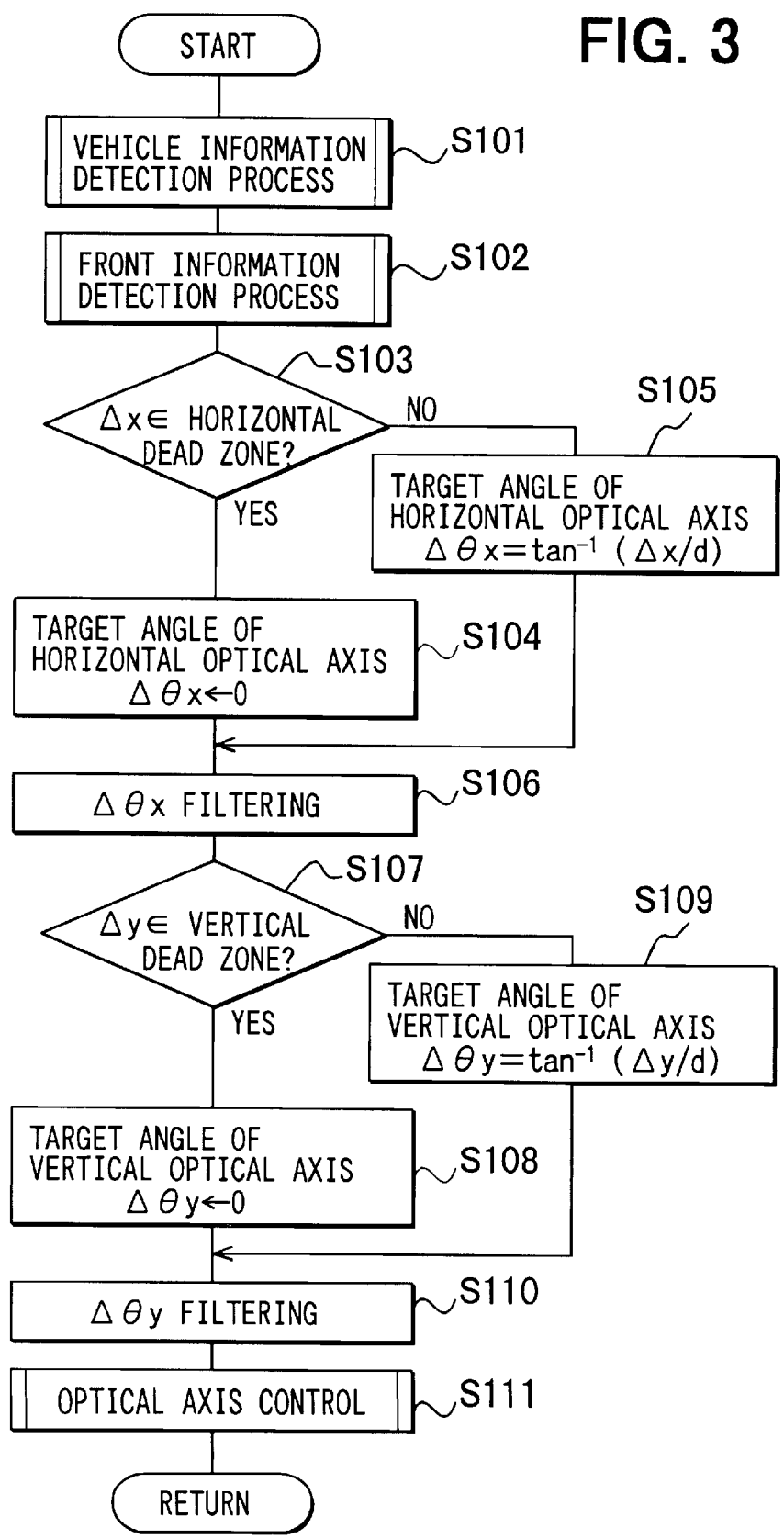
FIG. 3 is a flowchart of a control routine for controlling the headlight optical axis direction according to the invention.
Figure 4:
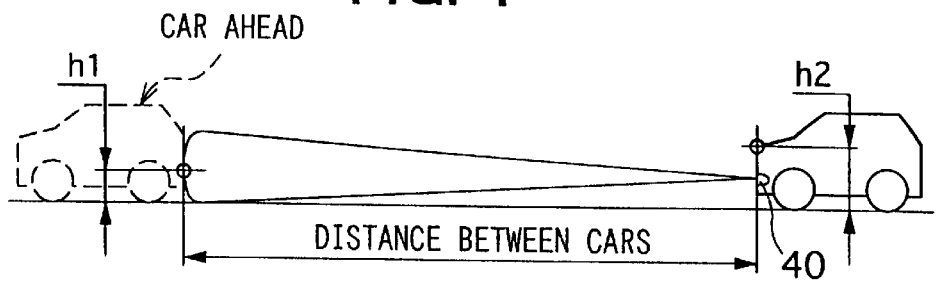
FIG. 4 is a schematic view showing the computation of the headlight optical axis inclination angle with reference to a distance from a car ahead according to the invention.
Figure 5:
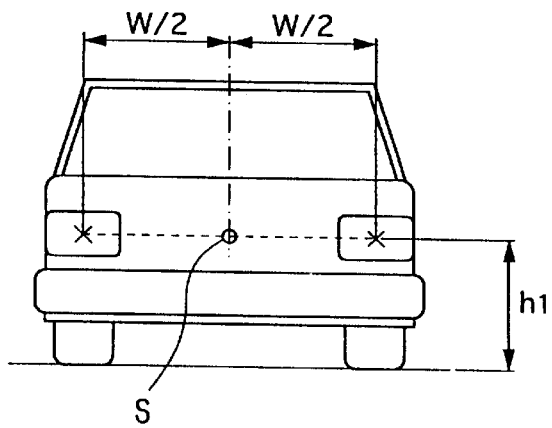
FIG. 5 is a schematic view showing a reference point of the car ahead being tracked by a laser radar mechanism according to the present invention.
Figure 6:
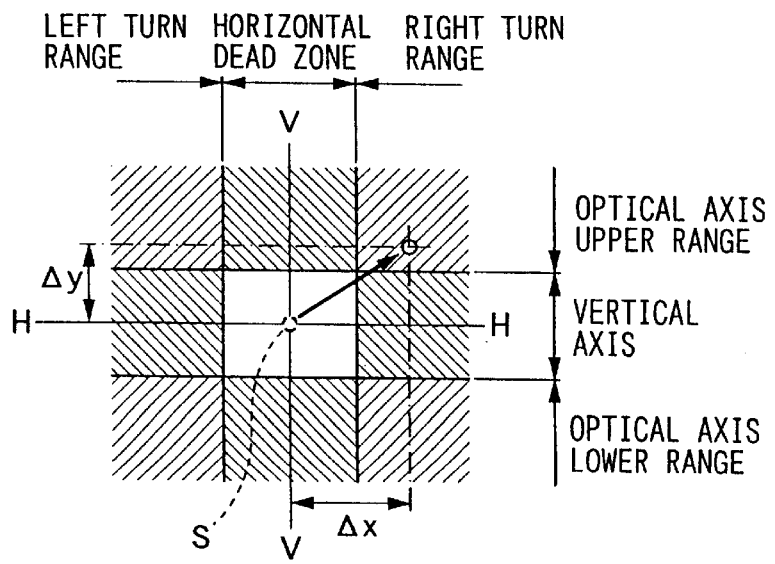
FIG. 6 is a table showing horizontal and vertical dead zones and surrounding ranges in relation to displacement from the reference point within a predetermined time according to the invention.

Next, FIG. 3 is a flowchart showing an optical axis adjustment control routine for adjusting the headlight optical axis direction 30 with the CPU 21 of the ECU 20. Referring to FIGS. 4, 5 and 6. The control routine is repetitively executed by the CPU 21 at a predetermined time.

It is first briefly described how the position of the reference point S is determined. It is known that a laser radar mechanism calculates the distance between the present vehicle and the car ahead, and then calculates relative speed. Further, when the object is recognized as the car driving within the predetermined area based on the relative speed, the car is followed. Moreover, it is known that the position is calculated on an XYZ coordinate axis based on the bounce of the laser which is reflected by the specific position of the car ahead. Therefore, the reference point S is calculated as shown below.

At step S101 in the flowchart of FIG. 3, the vehicle information detection process, for instance the inclination angle, is executed with reference to the value of rear vehicle height supplied from the height sensor 11. Also detected for vehicle inclination attitude includes movement, acceleration and deceleration of the vehicle from the car navigation system, speed from the speed sensor, force from the G sensor, etc. Subsequently, at step S102, as shown in FIG. 4, the distance d between vehicles is detected and the inclination angle θ of the headlight optical axis 30 is given by the equation below (1) to detect information in front of the vehicle by the laser radar mechanism 40. In the equation, h1 is a vehicle height above the road surface at which the driver of the car ahead will not be blinded, for example, a height to the center point (W/2) of a reflector in either stoplight as the reference point S in the car ahead as shown in FIG. 5. Furthermore, the height h2 is a height from the road surface up to the center position of the headlight 30 optical axis of the vehicle. For the heights h1 and h2, preset constants may be used. The height h1 may be changed according to the detected height of the car ahead. The height h2 may be a computed value based on the vehicle height, vehicle inclination, and a distance from the headlights 30 and the wheel axle.

Equation 1

$$\theta = \tan^{-1}\{(h2-h1)/d\} \quad (1)$$

Furthermore, at step S102, the amount of horizontal displacement Δx as the amount of horizontal (H) displacement within a predetermined time of the reference point S of the car ahead, and the amount of vertical displacement Δy as the amount of vertical (V) displacement within a predetermined time at the reference point S are detected as shown in FIG. 6.

Next, at step S103, it is evaluated whether the amount of H displacement Δx of the reference point S detected at step S102 is in the horizontal dead zone. The horizontal dead zone is provided for a dull reaction to slight horizontal variations of the reference point S of the car ahead. Where the amount of horizontal displacement Δx at step s103 is within the horizontal dead zone, the displacement within the predetermined time is small. At step S104, the target horizontal optical axis Δθx is set at 0°. In the meantime, where in step S103, the horizontal displacement Δx is largely in the left-turn right-turn range, out of the horizontal dead zone, a large displacement is within a predetermined period of time. Then, in step 105, the target horizontal optical axis Δθx is given by the following equation (2).

Equation 2

$$\Delta\theta x = \tan^{-1}(\Delta x/d) \quad (2)$$

Subsequent to step S104 or S105, the process goes to step 106, where the target horizontal optical axis Δθx is filtered. That is, the target angle of the horizontal optical axis Δθx is smoothed so that the headlight optical axis 30 will not be suddenly horizontally changed, not making the driver uncomfortable. Next, at step S107, whether the vertical displacement Δy of reference point S detected at step S102 is involved in the vertical dead zone is determined. The vertical dead zone is provided for a dull reaction to slight vertical variations of the reference point S caused by acceleration and deceleration of the car ahead. When the vertical displacement Δy S107 is within the vertical dead zone, the process goes to step S108 because the displacement within the predetermined time is small. At step S108 the target angle of vertical optical axis Δθy is set at 0°. On the other hand, when step S108 is not determined, that is, when the vertical displacement Δy is largely into the upper or lower optical axis range, out of the vertical dead zone, the process goes to step S109, where the target angle of vertical optical axis Δθy is given by the following equation (3).

Equation 3

$$\Delta\theta y = \tan^{-1}(\Delta y/d) \quad (3)$$

After step S108 or S109, the process goes to step S110, where the target angle of vertical optical axis Δθy is filtered. That is, the target angle of vertical optical axis Δθy is smoothed so that the headlight optical axis 30 will not be suddenly vertically changed, thereby not causing discomfort to the driver and others. Next, at step S111, the actuators 35 and 36 are driven with reference to the inclination angle during normal control to hold the headlight 30 optical axis in a fixed direction (downward 1% [or 1.2%]) to ensure a driver's has road visibility without blinding oncoming drivers. The center optical axis angle is corrected by adding, to the inclination angle, the target horizontal optical axis Δθx filtered at step S106 and the target angle of vertical optical axis Δθy filtered at step S110, thus completing the control routine.

The horizontal dead zone width and the vertical dead zone shown in FIG. 6 may be fixed, or may be changed by the distance between vehicles or by vehicle speed. It may be set such that the farther the car ahead is forward, the narrower the horizontal dead zone and the vertical dead zone. Also, the horizontal dead zone can be narrow symmetrically in the horizontal direction, or asymmetrically in the right direction, to thereby ensure easy reaction to behavior changes of the car ahead. Furthermore the vertical dead zone also may be narrowed symmetrically in the vertical direction or asymmetrically on the downward direction, thereby enabling easy reaction to changes ahead.

Figure 7:
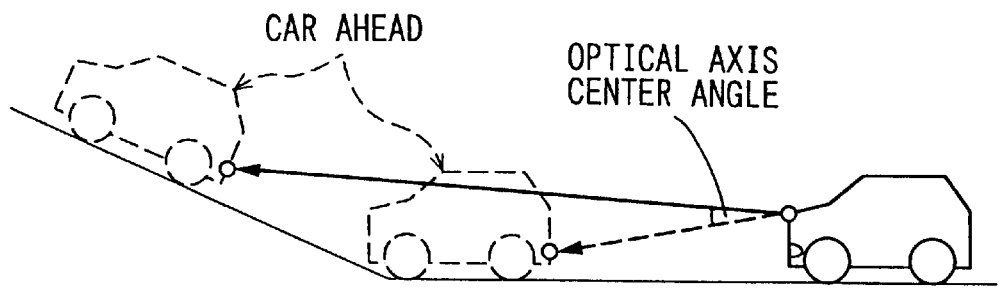
FIG. 7 is a schematic view showing the headlight optical axis tracking the behavior of the car ahead on an uphill by the automatic headlight aiming device for vehicles according to the invention.

An example is explained with respect to FIGS. 7 to 10. As shown in FIG. 7, when a car ahead moving straightforward has begun going up a hill, a change in the reference point S on the car ahead is detected by the laser radar mechanism 40. When the displacement detected with the change in the upward behavior of the car ahead goes out of the vertical dead zone and into the upper range of optical axis (see FIG. 6), the target angle of the vertical optical axis Δθy is computed by the equation (3). Using the target angle of the vertical optical axis Δθy thus computed, the headlight optical axis direction 30 is corrected upward. This correction is performed at predetermined time intervals.

Figure 8:
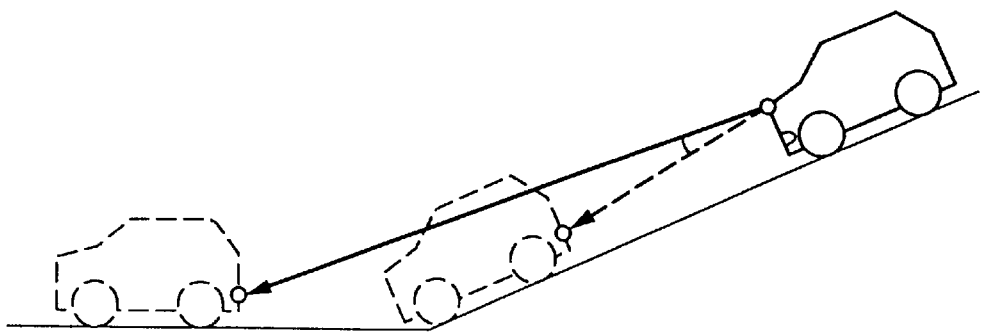
FIG. 8 is a schematic view showing the control of the headlight optical axis direction tracking the behavior of the car ahead downhill according to the invention.

FIG. 8 is an explanatory view showing the correction of the headlight 30 optical axis of a vehicle tracking the car ahead on a downhill. As shown in FIG. 8, when the car ahead has gone downhill to a level road, a change in the upward behavior of the reference point S is detected by the laser radar mechanism 40. If the displacement detected with change in upward movement of the car ahead moves out of the vertical dead zone and into the upper range of optical axis (see FIG. 6), the target angle of vertical optical axis Δθy is computed by the equation (3). The optical axis direction of the headlight 30 is corrected upward according to the target angle of vertical optical axis Δθy thus computed. Since this correction is conducted every predetermined time increment according to a behavior change of the car ahead, the direction of the headlight 30 optical axis can be matched with a behavior change in the car running ahead.

Figure 9:
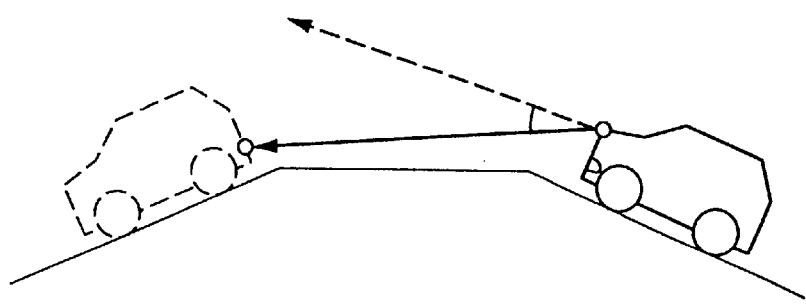
FIG. 9 is a schematic view showing the control of the headlight optical axis direction tracking the behavior of the car ahead according to the invention.

FIG. 9 is an explanatory view showing the correction control of the headlight optical axis 30 tracking the behavior of the car running ahead near a hilltop. As shown in FIG. 9, when the car running straightforward ahead is going down-hill and the other car is going uphill, a downward change of reference point S is detected. When this displacement leaves the vertical dead zone and goes into the lower range of optical axis (see FIG. 6), the target angle of vertical optical axis Δθy is computed by the equation (3), thereby correcting the headlight 30 optical axis downward. Since correction control is carried out at predetermined times according to a behavior change of the car ahead, the headlight optical axis 30 can be matched with the change in behavior of the car ahead.

Figure 10:
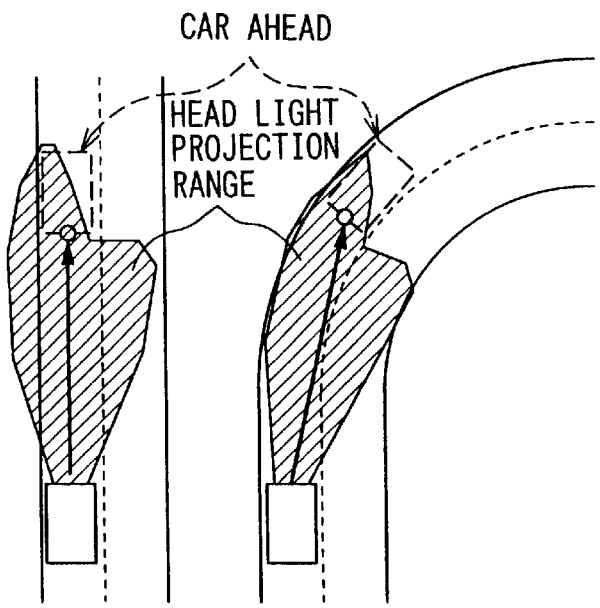
FIG. 10 is a schematic view showing tracking of the right-turn of the car ahead according to the invention.

FIG. 10 is an explanatory view showing the correction control of the headlight 30 optical axis tracking the right-turn behavior of the car running ahead straightforward. As shown in FIG. 10, when the car running straightforward ahead is on a level road and has come to a right-turn curve, the behavior change of the car ahead turning to the right from the reference point S is detected as the front information of the vehicle by means of the laser radar mechanism 40. If the displacement detected with the right-turn behavior of the car ahead goes out of the horizontal dead zone and into the right-turn range (see FIG. 6), the target horizontal optical axis Δθx is computed by the equation (2). Thus the headlight optical axis direction 30 is turned to the right, thereby correcting the range of light projection.

In the correction control of the headlight 30 optical axis, the light beam may be widened to the right instead of rightward correction control of the optical axis. During left turns also, the headlight optical axis direction 30 is corrected to the left or the light can be widened to the left. Correction control is conducted at predetermined time increments, thereby making it possible to set the range of light projection of the headlights 30 correspondingly to a behavior change of the car ahead and accordingly.

The vehicle information detecting means preferably includes the height sensor 11, car navigation system, etc. for detecting various vehicle information such as the inclination, movement, acceleration and deceleration of the vehicle itself; a laser radar mechanism 40 that detects front information; the inclination angle computing means of the CPU 21 of the ECU 20 which computes the inclination angle in relation to the headlight optical axis of the vehicle to the road surface with reference to an output signal from the vehicle information detecting means; the optical axis center angle computing means of the CPU 21 of the ECU 20 which computes the center optical axis angle by correcting the inclination angle computed by the inclination angle computing means with reference to the front information detected by the laser radar mechanism 40; and the optical axis adjusting means consisting of the CPU 21 of the ECU 20, and actuators 35 and 36, for adjusting the headlight optical axis direction 30 with reference to the center optical axis angle computed by the optical axis center angle computing means. Furthermore, the center optical axis angle is computed by the optical axis center angle computing means according to the displacement detected, with horizontal and vertical changes in the behavior of a car ahead, as a front information supplied from the laser radar mechanism 40.

The vehicle inclination angle is computed according to an output from the height sensor 11. The center optical axis angle is corrected and computed according to front information given by the car navigation system and the laser radar mechanism 40. Then, the headlight optical axis direction 30 is adjusted relative to the center optical axis angle. That is, road information in the direction of travel of a vehicle is given by the car navigation system, and front information is given by the laser radar mechanism 40. Road information and front information such as the presence or absence of a car ahead, a distance between vehicles, and a change in the horizontal and vertical behavior are seen. The headlight optical axis direction 30, therefore, can be adjusted with reference to the center optical axis angle which has been corrected by a road information given by the car navigation system and a behavior change of a car ahead as occasion calls, in relation to the inclination angle indicated by normal control at which the headlight optical axis direction 30 is fixed 1% (or 1.2%) lower only by a vehicle inclination attitude as a vehicle information from the height sensor 11.

Figure 11:
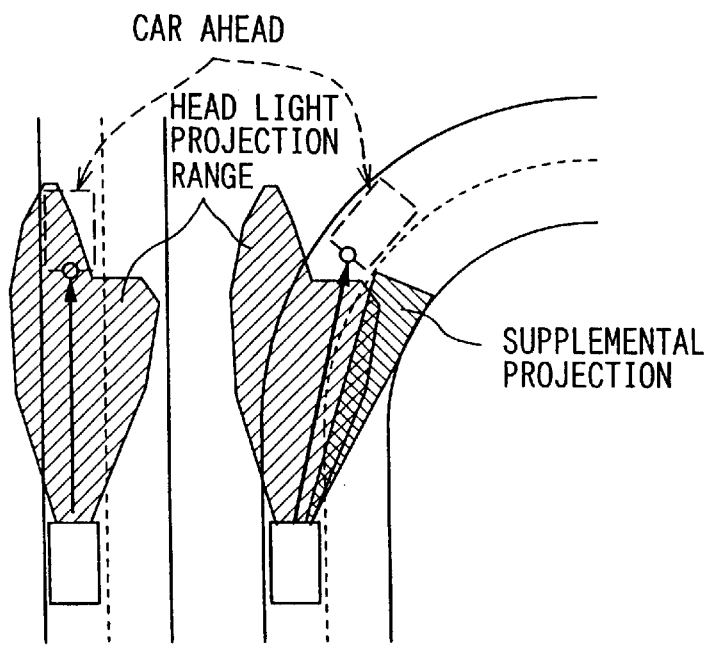
FIG. 11 is a schematic view showing headlight optical axis control tracking the right-turn of the car ahead according to the invention.

Next, by referring to FIG. 11, a correction control variation of the headlight optical axis direction 30 by the above-described control routine will be described. In FIG. 11, the headlights 30 in the present variation are vertically but not horizontally adjustable. That is, the actuator 36 is not mounted for the headlights 30 shown in FIGS. 1 and 2. Supplementary lamps are mounted on the left front/right front side of the vehicle.

As shown in FIG. 11, when a car running straightforward ahead on level road approaches a right-turn curve, a rightward change from the reference point S in the behavior of the car ahead is detected by the laser radar mechanism 40 as the front information of the vehicle. If the displacement detected with the rightward behavior change of the car ahead goes out of the horizontal dead zone into the right-turn range (see FIG. 6), the supplementary lamp (not shown) mounted on the right front side of the vehicle is turned on while the range of light projection of the headlights 30 remains unchanged.

In this case, the brightness of the supplementary lamp may be changed based on horizontal displacement of the car ahead and distance between the vehicles. Also, a plurality of supplementary lamps may be lit. Similarly, in a left turn, the supplementary lamp mounted on the left front side of the vehicle is lit. Because the correction control is carried out at predetermined time intervals with a behavior change of the car ahead, the supplementary lamp is lit to widen the range of light projection corresponding to the behavior change of the car ahead without changing the range of the horizontal light projection of the headlights 30. It is therefore possible to improve the driver's ability to view to the direction of turn ahead without blinding the driver of the car ahead.

In this embodiment, the supplementary lamps (not shown) mounted on the left front and right front sides of the vehicle are turned on to project light to a predetermined range ahead according to the right or left turn of the car ahead. When the displacement exceeding the predetermined value corresponds to a change in horizontal behavior of the car ahead has been detected as the front information by the laser radar mechanism 40 which functions as the front information detecting means, the supplementary lamp turns on corresponding to the turn direction of the vehicle by the optical axis adjusting means comprising the CPU 21 of the ECU 20 and the actuator 35.

That is, when the displacement exceeds the predetermined value corresponding to a change in the horizontal behavior of the car ahead, the corresponding right or left front supplementary lamp is lit, thereby widening the light projection range. Furthermore, control may be made by combining a headlight adjusting mechanism capable of adjusting the vehicle headlights horizontally and supplementary lamps.

It is noted that the laser radar calculates a distance between the car ahead and the present vehicle. If the distance does not change during a predetermined time period, it is determined that the targeted vehicle is actually a moving vehicle and not just an object on the side of the road.

While the above-described embodiments refer to examples of usage of the present invention, it is understood that the present invention may be applied to other usage, modifications and variations of the same, and is not limited to the disclosure provided herein.

What is claimed is:

1. An automatic headlight aiming device for a vehicle, comprising:

a vehicle information detecting means for detecting vehicle information that includes information about at least one of the inclination, movement, and acceleration and deceleration of the vehicle;

a front information detecting means for detecting information in front of the vehicle to be used in conjunction with the vehicle information detected by the vehicle information detecting means;

an inclination angle computing means for computing an inclination angle of a headlight optical axis with respect to a road surface based on the information and output from the vehicle information detecting means;

an optical axis center angle computing means for computing a center angle of the headlight optical axis by correcting the inclination angle computed by the inclination angle computing means based on information in front of the vehicle detected by the front information detecting means;

an optical axis adjusting means for adjusting the headlight optical axis direction with reference to the center optical axis angle computed by the optical axis center angle computing means according to the information in front of the vehicle fed from and detected by the front information detecting means;

a horizontal adjusting means for horizontally adjusting the optical axis to project light within a predetermined forward range corresponding to a right or left turn of the vehicle; and wherein the optical axis adjusting means adjusts the headlight optical axis with the horizontal adjusting means corresponding to a horizontal vehicle turn when a vehicle ahead is displaced by a value which is outside of a predetermined horizontal dead zone, the horizontal vehicle turn being front information detected by the front information detecting means, and wherein the optical axis adjusting means maintains the headlight optical axis with the horizontal adjusting means when the vehicle ahead remains within the predetermined horizontal dead zone.

2. An automatic headlight aiming device according to claim 1, wherein the optical axis center angle computing means computes the center angle based on detected horizontal and vertical displacement of a vehicle ahead as the information in front of the vehicle.

3. An automatic headlight aiming device for a vehicle, comprising:

a vehicle information detecting means for detecting vehicle information that includes information about at least one of the inclination, movement, and acceleration and deceleration of the vehicle;

a front information detecting means for detecting information in front of the vehicle to be used in conjunction with the vehicle information detected by the vehicle information detecting means;

an inclination angle computing means for computing an inclination angle of a headlight optical axis with respect to a road surface based on the information and output from the vehicle information detecting means;

an optical axis center angle computing means for computing a center angle of the headlight optical axis by correcting the inclination angle computed by the inclination angle computing means based on information in front of the vehicle detected by the front information detecting means;

an optical axis adjusting means for adjusting the headlight optical axis direction with reference to the center optical axis angle computed by the optical axis center angle computing means according to the information in front of the vehicle fed from and detected by the front information detecting means;

wherein said vehicle has supplemental lamps on a right front side and a left front side of the vehicle, said supplemental lamps projecting light within a predetermined forward range corresponding to a right or left turn of the vehicle;

the optical axis adjusting means turns on at least one of the supplemental lamps corresponding to a vehicle turning direction when a displacement of a vehicle ahead has been detected as being outside of a predetermined horizontal dead zone, with a horizontal change in behavior of the vehicle ahead as the front information detected by the front information detecting means.

4. A method of aiming a headlight of a vehicle, the method comprising:

detecting vehicle information that includes information about at least one of the inclination, movement, acceleration and deceleration of the vehicle;

detecting information in front of the vehicle including a relative location of a second vehicle ahead of said vehicle;

computing an inclination angle of a headlight optical axis with respect to a road surface based on the detected vehicle information;

computing a center angle of the headlight optical axis by correcting the computed inclination angle based on the detected information in front of the vehicle;

adjusting the headlight optical axis direction with reference to the computed center angle of the headlight optical axis according to the detected information in front of the vehicle including horizontally adjusting the headlight optical axis to project light from the headlight within a predetermined forward range when the second vehicle is displaced by a value which is outside of a predetermined horizontal dead zone and maintaining the headlight optical axis when the second vehicle remains within the predetermined horizontal dead zone.

5. A method of operating a plurality of lights of a vehicle including a headlight and supplemental lamps respectively on a right front side and a left front side of the vehicle, the method comprising:

detecting vehicle information that includes information about at least one of the inclination, movement, acceleration and deceleration of the vehicle;

detecting information in front of the vehicle including a location of a second vehicle ahead of said vehicle;

computing an inclination angle of a headlight optical axis with respect to a road surface based on the detected vehicle information;

computing a center angle of the headlight optical axis by correcting the computed inclination angle based on the detected information in front of the vehicle;

adjusting the headlight optical axis direction with reference to the computed center angle of the headlight optical axis according to the detected information in front of the vehicle;

turning on at least one of the supplemental lamps when a horizontal displacement of the second vehicle has been detected as being outside of a predetermined horizontal dead zone, the horizontal displacement of the second vehicle being detected information in front of the vehicle; and turning or maintaining off the supplemental lamps when the horizontal displacement of the second vehicle has been detected as being within the predetermined horizontal dead zone.

6. A method of operating a plurality of lights of a vehicle including a headlight and supplemental lamps respectively on a right front side and a left front side of the vehicle, the method comprising:

detecting vehicle information that includes information about at least one of the inclination, movement, acceleration and deceleration of the vehicle;

detecting information in front of the vehicle including a location of a second vehicle ahead of said vehicle;

turning on at least one of the supplemental lamps when a horizontal displacement of the second vehicle has been detected as being outside of a predetermined horizontal dead zone; and turning or maintaining off both of the supplemental lamps when the location of the second vehicle is detected as being within the predetermined horizontal dead zone.

7. The method of claim 6, further comprising adjusting an optical axis of the headlight when a displacement of the second vehicle is detected as being outside of a predetermined vertical dead zone and maintaining the optical axis of the headlight wherein the second vehicle is detected as remaining within the predetermined vertical dead zone.

8. The device of claim 1 wherein the headlight optical axis is adjusted by the optical axis adjusting means based on the amount of displacement of the vehicle ahead measured within a predetermined time period.

9. The device of claim 1, wherein the horizontal dead zone is changed based on the distance between the vehicle and the vehicle ahead.

10. An automatic headlight aiming device for a vehicle, comprising:

a vehicle information detecting means for detecting vehicle information that includes information about at least one of the inclination, movement, and acceleration and deceleration of the vehicle;

a front information detecting means for detecting information in front of the vehicle to be used in conjunction with the vehicle information detected by the vehicle information detecting means;

an inclination angle computing means for computing an inclination angle of a headlight optical axis with respect to a road surface based on the information and output from the vehicle information detecting means;

an optical axis center angle computing means for computing a center angle of the headlight optical axis by correcting the inclination angle computed by the inclination angle computing means based on information in front of the vehicle detected by the front information detecting means;

an optical axis adjusting means for adjusting the headlight optical axis direction with reference to the center optical axis angle computed by the optical axis center angle computing means according to the information in front of the vehicle fed from and detected by the front information detecting means; and a vertical adjusting means for vertically adjusting the optical axis to project light within a predetermined forward range;

wherein the optical axis adjusting means adjusts the headlight optical axis with the vertical adjusting means when a vehicle ahead is displaced by a value which is outside of a predetermined vertical dead zone, and wherein the optical axis adjusting means maintains the headlight optical axis with the vertical adjusting means when the vehicle ahead remains within the predetermined vertical dead zone.

11. A method of aiming a headlight of a vehicle, the method comprising:

detecting vehicle information that includes information about at least one of the inclination, movement, acceleration and deceleration of the vehicle;

detecting information in front of the vehicle including a relative location of a second vehicle ahead of said vehicle;

computing an inclination angle of a headlight optical axis with respect to a road surface based on the detected vehicle information;

computing a center angle of the headlight optical axis by correcting the computed inclination angle based on the detected information in front of the vehicle; and adjusting the headlight optical axis direction with reference to the computed center angle of the headlight optical axis according to the detected information in front of the vehicle including vertically adjusting the headlight optical axis to project light from the headlight within a predetermined forward range when the second vehicle is displaced by a value which is outside of a predetermined vertical dead zone and maintaining the headlight optical axis when the second vehicle remains within the predetermined vertical dead zone.

12. The device of claim 10, wherein the vertical dead zone is changed based on a distance between the vehicle and the vehicle ahead.

13. The method of claim 11, wherein the vertical dead zone is changed based on a distance between the vehicle and the second vehicle.

* * * * *